United States Patent
Subramanian et al.

(10) Patent No.: US 7,720,867 B2
(45) Date of Patent: May 18, 2010

(54) NATURAL LANGUAGE QUERY CONSTRUCTION USING PURPOSE-DRIVEN TEMPLATE

(75) Inventors: Keshavan Subramanian, San Francisco, CA (US); George Joby, Foster City, CA (US); Sunil S. Ranka, Cupertino, CA (US); Veena Bhandarkar, Belmont, CA (US); Indranil Goswami, Kolkata (IN); Hui Li, Temple City, CA (US); Robert M. Sego, Arcadia, CA (US)

(73) Assignee: Oracle International Corporation, Redwood Shores, CA (US)

( * ) Notice: Subject to any disclaimer, the term of this patent is extended or adjusted under 35 U.S.C. 154(b) by 471 days.

(21) Appl. No.: 10/937,602

(22) Filed: Sep. 8, 2004

(65) Prior Publication Data

US 2006/0053096 A1    Mar. 9, 2006

(51) Int. Cl.
*G06F 7/00* (2006.01)
(52) U.S. Cl. .................. 707/793; 707/769; 707/791
(58) Field of Classification Search ............. 707/3, 707/4
See application file for complete search history.

(56) References Cited

U.S. PATENT DOCUMENTS

| | | | |
|---|---|---|---|
| 5,778,357 A * | 7/1998 | Kolton et al. ............ 707/2 |
| 5,778,368 A * | 7/1998 | Hogan et al. ............ 707/10 |
| 5,909,678 A * | 6/1999 | Bergman et al. ......... 707/4 |
| 5,966,695 A * | 10/1999 | Melchione et al. ....... 705/10 |
| 6,272,489 B1 * | 8/2001 | Rauch et al. ............. 707/4 |
| 6,785,668 B1 * | 8/2004 | Polo et al. ................ 707/2 |
| 7,013,312 B2 * | 3/2006 | Bala et al. ............... 707/200 |
| 2003/0195765 A1 * | 10/2003 | Sehgal et al. ............ 705/1 |
| 2004/0059604 A1 | 3/2004 | Zaleski et al. |
| 2004/0064353 A1 * | 4/2004 | Kim et al. ............... 705/8 |
| 2004/0073539 A1 * | 4/2004 | Dettinger et al. ........ 707/3 |
| 2004/0111666 A1 * | 6/2004 | Hollcraft ................. 715/503 |
| 2004/0153341 A1 | 8/2004 | Brandt et al. |
| 2004/0177073 A1 | 9/2004 | Snyder et al. |
| 2004/0243441 A1 | 12/2004 | Bocionek et al. |
| 2004/0249672 A1 | 12/2004 | Bocionek et al. |
| 2004/0249674 A1 | 12/2004 | Eisenberg et al. |
| 2004/0260593 A1 | 12/2004 | Abraham-Fuchs et al. |
| 2005/0027632 A1 * | 2/2005 | Zeitoun et al. .......... 705/36 |
| 2005/0210001 A1 * | 9/2005 | Lee ......................... 707/3 |

* cited by examiner

*Primary Examiner*—Etienne P LeRoux
*Assistant Examiner*—Cindy Nguyen
(74) *Attorney, Agent, or Firm*—Hickman Palermo Truong & Becker LLP

(57) ABSTRACT

Constructing a query in a natural-language format using a purpose-driven query template. A user is prompted to select one of a plurality of query purposes. User-input is received indicating a selected one of the plurality of query purposes. A first list of conditions is selected from a plurality of lists of conditions based on the selected one of the plurality of query purposes, then displayed in a format in which each of a plurality of conditions in the first list is grammatically joined to at least one other condition in the first list to form a query sentence, and wherein each of the plurality of conditions in the first list is associated with a respective set of user-selectable values.

39 Claims, 19 Drawing Sheets

Create List

List Name [ ] ~25

Audience [Financial Services Data Mart ▼] ~27

Purpose [Cross Sell ▼] ~35
- Cross Sell
- Up Sell
- Customer Acquisition
- Customer Retention
- Lead Maturation

[Cancel] ~39  [Continue] ~37

List Creation Method

31 ⦿ Standard
  Using Natural Language Query

33 ○ Advanced
  Using List, Segment, Discoverer Workbook or SQL

Fig. 1

Create List

List Name List of Cross Sell Customers
Audience Financial Services Data Mart
List Template Name Cross Sell Credit Cards to Bank Account Customers Status Draft
Purpose Cross Sell Selections

[Modify Selections] [Recalculate] [Preview Entries] [Cancel] [Back] [Finish]

| Selections | Projected Running Total | Detail | Delete |
|---|---|---|---|
| Bank Account Type is <Select Bank Account Type> | | | 🗑 |
| and <Select Bank Account Type> Balance is greater than <Enter Number> USD | | | 🗑 |
| and Has Credit Card is <Select Value> | | | 🗑 |
| and Age is between <Enter Number> and <Enter Number> | | | 🗑 |
| and Credit Risk Classification is not <Select Value> | | | 🗑 |

▶ List Options

▶ SQL Statement

Create List

| | |
|---|---|
| List Name | List of Cross Sell Customers |
| Audience | Financial Services Data Mart |
| List Template Name | Cross Sell Credit Cards to Bank Account Customers |

Status Draft
Purpose Cross Sell

Cancel  Back  Finish

Selections ~115

[Modify Selections] [Recalculate] [Preview Entries]

| Selections | Projected Running Total | Delta | Delete |
|---|---|---|---|
| Bank Account Type is Checking Account ~227, 227 | | | 🗑 |
| and Checking Account Balance is greater than 2000 USD ~228 | | | 🗑 |
| and Has Credit Card is No ~229 | | | 🗑 |
| and Age is between 18 and 35 ~230, 231 | | | 🗑 |
| and Credit Risk Classification is not High ~232 | | | 🗑 |

▶ List Options ~121

▶ SQL Statement ~123

Fig. 6

Create List

List Name List of Cross Sell Customers
Audience Financial Services Data Mart
List Template Name Cross Sell Credit Cards to Bank Account Customers Status Draft
Purpose Cross Sell Cancel  Back  Finish Selections ~115

[Modify Selections] [Recalculate] [Preview Entries] ~117 ~119

| Selections | Projected | Running Total | Delta | Delete |
|---|---|---|---|---|
| Bank Account Type is Checking Account ~225₁ | | 3950 | 0 | 🗑 |
| and Checking Account Balance is greater than 2000 USD ~225₂ | | 2875 | -1075 | 🗑 |
| and Has Credit Card is No ~225₃ | | 1150 | -1725 | 🗑 |
| and Age is between 18 and 35 ~225₄ | | 875 | -275 | 🗑 |
| and Credit Risk Classification is not High ~225₅ | | 500 | -375 | 🗑 |

▶ List Options ~121

▶ SQL Statement ~123

Fig. 7

Update List

List Name: List of Cross Sell Customers
Audience: Financial Services Data Mart
List Template Name: Cross Sell Credit Cards to Bank Account Customers Status: Available
Purpose: Cross Sell
Description:

Selections | Generation | Entries | Charts | Notes

Saved Searches [Go]
View: Person Details [Personalize]

Choose Action [Split List] [Go]

⊙ Previous  Next 10 ⊙

| Enabled | Person Name | Full Address | Email Address | Gender | Marital Status | Lifestage | Credit Classification |
|---|---|---|---|---|---|---|---|
| ☑ | James Symonds | 200 W. Chester Ave., MI, US | jsymonds@abc.com |  | S | 2 | Low |
| ☑ | John Doherty | 1650 Market St., CA, US | jdoherty@map.com | M | M | 4 | Medium |
| ☑ | Julie Andrews | 3100 Main St., Chicago, IL, US | julie@yahoo.com | F | M | 5 | Medium |
| ☑ | Michael More | 1200 Glencoe Hills, Seattle, WA, US | mike.moore@abcn.com | M |  |  | Low |
| ☑ | Bob Scholes | 101 Second St, Ann Arbor, MI, US | bob.scholes@yahoo.com |  |  |  | Low |
| ☑ | Drew Swartz | 1200 Piedmont, Phoenix, AZ, US | dswartz@heavenly.com | M | M | 6 | Low |
| ☑ | Mary Jones | 121 Durant St, Austin, TX, US | jones@intellisent.com | F | S | 2 | Low |
| ☑ | Jason hoke | 412 Cheshire St., San Diego, CA, US | jason.hoke@jj.com | M | S | 2 | Low |
| ☑ | William Slutsky | 121 Bacon Avenue, Miami, FL, US | bill.slutsky@levers.com |  |  |  | Medium |
| ☑ | Scot Hunter | 875 Tulane Dr, OH, US | scot.hunter@sky.com | M | M | 4 | Low |

⊙ Previous  Next 10 ⊙

[Cancel] [Apply]

Fig. 9

Select

Select All | Select None

| Select | Purpose Name |
|---|---|
| ☐ | Cross Sell |
| ☐ | Customer Acquisition |
| ☐ | Customer Retention |
| ☐ | General Purpose |
| ☐ | Lead Maturation |
| ☐ | Up Sell |

[Cancel] [Select]

Fig. 11

Create Standard Query Template

Query Template Name  Cross Sell Credit Cards to Bank Account Customers  Query Template Type  Standard
Data Source Name  Financial Services Data Mart  Table or View Name  FDM_CUSTOMERS  515
Data Source Code  FINANCE_DATA_MART  Unique Identifier  CUSTOMER_ID  484
Purpose  Cross Sell

482

Query Template Selections

Specify the selections for this template. To display the selection by default, select the corresponding Default column. A mandatory selection for a template cannot be deleted by the end-user. To validate the selections, select Validate. Select Preview Selections to display and test the template selections.

| Attributes | Attribute Display Name | Available Operators | Operator Default | Value | Value Display | Default | Mandatory | In Use | Delete |
|---|---|---|---|---|---|---|---|---|---|
| No data exists. | 489 | 491 | 493 | 495 | 497 | 499 | 501 | 503 | 505 |
| Add Another Row | | | | | | | | | |

510  487  485

(Validate) 507  (Preview Template Selections) 509

480

(Cancel) (Back) (Finish)
515  513  511

Fig. 12

Create Standard Query Template

Query Template Name  Cross Sell Credit Cards to Bank Account Customers   Query Template Type  Standard
Data Source Name  Financial Services Data Mart                           Table or View Name  FDM_CUSTOMERS
Data Source Code  FINANCE_DATA_MART                                      Unique Identifier  CUSTOMER_ID
Purpose  Cross Sell

Query Template Selections

Specify the selections for this template. To display the selection by default, select the corresponding Default column. A mandatory selection for a template cannot be deleted by the end-user. To validate the selections, select Validate. Select Preview Selections to display and test the template selections.

| Attributes | Attribute Display Name | Available Operators | Operator | Default Value | Value Display | Default | Mandatory | In Use | Delete |
|---|---|---|---|---|---|---|---|---|---|
| 467 | 489 | 491 | 493 | 495 | 497 | 499 | 501 | 503 | |

Add Another Row    Validate    Preview Template Selections

Cancel    Back    Finish

Fig. 13

Select: Available Attributes

| | Cancel | Create Selfjoin | Select |

Optional Parameter [▶] ~570

575    571    573

| Select/Attribute | |
|---|---|
| ⊙ | ▶ Financial Services Customers ~561 |
| 566₁ ○ | Person Name ~562₁ |
| 566₂ ○ | Email Address ~562₂ |
| 566₃ ○ | Age ~562₃ |
| 566₄ ○ | Marital Status ~562₄ |
| ⊙ | ▶ Bank Accounts ~563 |
| 567₁ ○ | Account Type ~564₁ |
| 567₂ ○ | Account Balance ~564₂ |
| ○ | ▲ Account Transactions ~565 |

Select: Available Operators

Select All | Select None

| Select | Operator | Display Name |
|--------|----------|--------------|
| ☑ | = | is equal to |
| ☑ | <> | is not equal to |
| ☐ | in | in |
| ☐ | not in | not in |
| ☐ | like | like |
| ☐ | not like | not like |
| ☑ | < | is less than |
| ☑ | > | is greater than |
| ☑ | between | is between |

Cancel  Select

Fig. 15

Select: Available Values

Mode [List of Values ▼]  653 Cancel   651 Select
- List of Values
- Attributes
- Calculation
- User Input

647 GO  645

642 Select All | Select None

| Select | Name |
|--------|------|
| ☑ 641₁ | Certification of Deposit 643₁ |
| ☑ 641₂ | Checking Account 643₂ |
| ☐ 641₃ | Checking Account - Premium 643₃ |
| ☑ 641₄ | IRA 643₄ |
| ☑ 641₅ | Savings Account 643₅ |
| ☐ 641₆ | Savings Account Premium 643₆ |

Create Standard Query Template

Query Template Name  Cross Sell Credit Cards to Bank Account Customers    Query Template Type  Standard
Data Source Name  Financial Services Data Mart                              Table or View Name  FDM_CUSTOMERS
Data Source Code  FINANCE_DATA_MART                                         Unique Identifier  CUSTOMER_ID
Purpose  Cross Sell

Query Template Selections

Specify the selections for this template. To display the selection by default, select the corresponding Default column. A mandatory selection for a template cannot be deleted by the end-user. To validate the selections, select Validate. Select Preview Selections to display and test the template selections.

| Attributes | Attribute Display Name | Available Operators | Operator | Default Value | Value Display | Default | Mandatory | In Use | Delete |
|---|---|---|---|---|---|---|---|---|---|
| Bank Accou... | Bank Account Type | is, is not | is | Checkin... | <Select Bank | ☑ | ☑ | | 🗑 |
| <Select Bank | Balance | is equal to, is no... | is greater th... | User Inp... | <Enter Numbe... | ☑ | ☐ | | 🗑 |

Add Another Row

Cancel   Back   Finish

Validate   Preview Template Selections

Fig. 17

Preview Query Template Selections

Click the corresponding hyperlink to view the associated list of values.

| Selections | | Reorder |
|---|---|---|
| Bank Account Type is <Select Bank Account Type>  ~723₁ | | 🔃 |
| and <Select Bank Account Type> Balance is greater than <Enter Number> USD  ~723₂  727 | | 🔃 |
| and Has Credit Card is <Select Value>  ~723₃ | | 🔃 |
| and Age is between <Enter Number> and <Enter Number>  ~723₄ | | 🔃 |
| and Credit Risk Classification is not <Select Value>  ~723₅ | | 🔃 |
| and Customer Located in <Select City>  ~723₆ | | 🔃 |

[Cancel] [Back] [Finish]

720, 721, 729, 731, 733

Fig. 18

NATURAL LANGUAGE QUERY CONSTRUCTION USING PURPOSE-DRIVEN TEMPLATE

FIELD OF THE INVENTION

The present invention relates generally to data processing systems, and more particularly to query construction in a database management system.

BACKGROUND

In early data processing systems, users seeking to query a database typically required knowledge of the database structure in order to generate an appropriate query expression. For example, a user might inspect the headings of various columns of data within the database, then enter a query expression that specifies a subset of the columns and search terms to be applied within the specified columns. While such an open-system approach enables flexible and precise query construction, it tends to be impractical in applications where the underlying structure and complexity of the database is necessarily hidden from selected classes of users. Even when the underlying structure of the database may be broadly exposed, users not specifically trained in the database structure and query syntax may find it difficult to construct appropriate query expressions; a circumstance that typically leads to inaccurate query results and an increased number of database queries as users attempt to refine query expressions through trial and error.

Two general query construction techniques have been developed to enable users to construct query expressions without exposing the underlying structure and complexity of the database: form-guided query construction and natural language parsing. In form-guided query construction, a user enters search terms into fields of an on-screen form. Each field is typically labeled to indicate the nature of data to be entered and corresponds to one or more columns of data within the database to be searched. After the user enters the information and requests the search results, the database management system constructs a query expression based on the user-entered information, then executes the query. While the form-guided approach works well for simple searches, it is often impractical to provide an entry field for each searchable column of the database so that the resulting query expressions tend to be limited to a subset of the searchable columns and to specific logical combinations of column search results. Also, to achieve combinations of search terms to be searched within a given column, the user typically must become familiar with the available set of operators and the consequences of including operators with different types of search terms. Similarly, the user may need to become familiar with one or more wildcard operators to cover desired declensions of search terms. Because such complexities tend to be daunting to many users, the form-guided approach is often limited to applications that require only a subset of the database columns to be searched using a relatively simple set of operators. When more advanced queries are required, form-guided systems may direct users to bypass the entry forms and enter queries more directly using the open-system approach described above.

In natural language parsing, the user enters an unstructured search phrase that expresses the desired search results. In contrast to the open-system and form-guided approaches, the user is not required to identify which search terms correspond to which database columns and is not required to adhere to a particular set of operators or query syntax. Instead, the system executes a language parsing program to identify keywords and operators in the search phrase, generate likely declensions of the keywords, identify database columns to which the keywords may apply, and construct a structured query expression that combines the declensions of the keywords in the manner specified by the operators to search the database. A key benefit of query construction through natural language parsing is that users may enter search phrases without knowing the underlying database structure and or the system query language. Unfortunately, query expressions created through natural language parsing may fail to return accurate search results due to imprecise keyword/operator identification, declension generation, and keyword-to-database column matching. Consequently, systems that have natural language query construction interfaces often provide alternative query construction interfaces such as the form-guided and open-system interfaces described above.

BRIEF DESCRIPTION OF THE DRAWINGS

The features and advantages of the present invention are illustrated by way of example, and not by way of limitation, in the figures of the accompanying drawings and in which like reference numerals refer to similar elements and in which:

FIG. 1 illustrates a list creation interface that may be presented to a database user to enable selection of a query purpose;

FIG. 3 illustrates an embodiment of a natural language query expression and corresponding meta-information;

FIG. 4 illustrates a dialog box that may be used to select one of a plurality of operators to be included in a query expression;

FIG. 6 illustrates an exemplary display of the query expression of FIG. 3 after each of the different value prompts has been replaced with a selection made from a respective list of values or with a user-input value;

FIG. 7 illustrates an exemplary display of the query expression of FIG. 3 that lists the total number of records remaining after each condition in the query expression is applied and the change in the number of records after application of each narrowing condition;

FIG. 9 illustrates an exemplary display of query results;

FIG. 11 illustrates an exemplary query purpose list that may be displayed to enable an administrator to select one or more query purposes to be associated with or removed from association with a query template;

FIG. 12 illustrates an exemplary display to enable an administrator to enter conditions to be included in a natural language query template;

FIG. 13 illustrates the condition-entry display of FIG. 12 after the administrator has elected to add a row to a conditions table;

FIG. 14 illustrates an exemplary attribute selection display to enable an administrator to select an attribute to be included in a condition of the conditions table of FIG. 13;

FIG. 15 illustrates an exemplary operator selection display to enable an administrator to select a set of operators to be included in a condition of the conditions table of FIG. 13;

FIG. 16 illustrates an exemplary value selection display to enable an administrator to select a set of values to be included in a condition of the conditions table of FIG. 13;

FIG. 17 illustrates the state of the conditions table of FIGS. 12 and 13 after a pair of conditions have been entered;

FIG. 18 illustrates an exemplary template-preview display to enable an administrator to preview a query expression containing the conditions entered into the conditions table of FIGS. 12 and 13.

DETAILED DESCRIPTION

Figure 2:
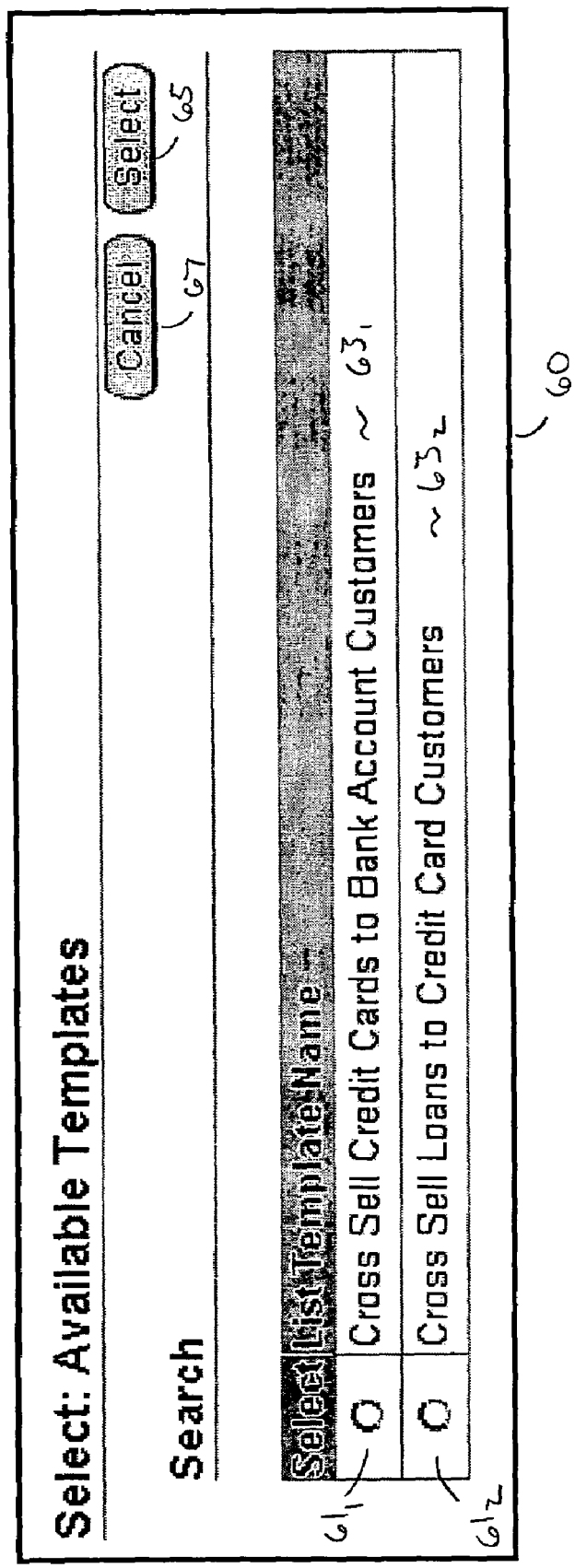
FIG. 2 illustrates an embodiment of a pop-up display that may be used to present an exemplary list of purpose-driven query templates to a user.

In the following description and in the accompanying drawings, specific terminology and drawing symbols are set forth to provide a thorough understanding of the present invention. In some instances, the terminology and symbols may imply specific details that are not required to practice the invention. Similarly, while the invention is set forth with reference to exemplary embodiments, it will be evident that various modifications and changes may be made to such embodiments without departing from the broader spirit and scope of the invention. The term "exemplary" is used herein to express but an example, and not a preference or requirement.

In embodiments of the present invention combination of purpose-driven query template selection and natural-language query presentation are used to enable construction of query expressions having the precision of prior-art attribute-entry query constructions, yet the natural language format of natural-language entry systems. In one embodiment, a user seeking to query a data source selects a query purpose from a list of predetermined query purposes. The database management system responds to the query purpose selection by presenting a corresponding query expression in a natural language format that prompts the user to select search terms and operators. After selecting search terms and operators, the user may execute the query to obtain a query result.

Constructing a Purpose-Driven, Natural-Language Query

FIG. 1 illustrates a list creation interface 20 that may be presented to a database user to enable selection of a query purpose. The user may enter a list name in field 25 to specify a name for the search result to be obtained, and may select from among a number of different data sources (e.g., database tables, views, joins, query results, etc.) using pull-down menu 26 (i.e., by clicking pull-down icon 27, a menu of selectable data sources is displayed). The user may similarly select from among a number of different query purposes using pull-down menu 35. Although marketing-related query purposes are shown in the pull-down menu 35, virtually any additional or alternative types of query purposes and categories of query purposes may be presented in alternative embodiments. Also, the query purposes presented in pull-down menu 35 may be a subset of a broader list of query purposes, with the subset being selected by the user or determined automatically based on other user-entered information (e.g., audience for list, data source selection, etc.). After selecting a query purpose, the user may elect to proceed using either a natural-language-formatted query expression, or another type of query expression (e.g., a guided-form expression, structured query language expression, etc.) by clicking either button 31 or button 33, respectfully. Assuming that a natural-language-formatted query expression is elected, the user is prompted by presentation of template selection icon 29 to select from among a list of query templates associated with the selected query purpose (i.e., purpose-driven query templates). In one embodiment, the list of query templates associated with a given query purpose is developed by an administrative user (i.e., an administrator) using techniques discussed below. In alternative embodiments, the query templates or any subset thereof may be pre-defined within the data processing system.

FIG. 2 illustrates an embodiment of a pop-up display 60 that may be used to present an exemplary list of purpose-driven query templates to a user in response to the user's actions of selecting a cross sell query purpose, electing natural language query format and clicking the template selection icon, as described in reference to FIG. 1. The user may select either of the query templates $63_1$ or $63_2$ by clicking one of buttons $61_1$ and $61_2$, respectively. In alternative embodiments, any number of additional or alternative purpose-driven query templates may be displayed in pop-up display 60. After clicking a button 61 that corresponds to the desired query template, the user may click select button 65 to complete the template selection and return to the list creation interface 20 of FIG. 1. If none of the listed query templates 63 matches the user's query purpose, the user may click cancel button 67 to return to the list creation interface 20 of FIG. 1 to select a different query purpose and/or data source, then return to display 60 to select from a correspondingly different list of query templates. In an alternative embodiment, the user may opt to generate a new purpose-generated query template (e.g., by clicking a "generate template" button, not shown) to be added to the pop-up display if none of the query templates matches the user's query purpose.

Returning to FIG. 1, after the user has selected a query template from the display 60 of FIG. 2, the name of the query template (also referred herein as a list template) is presented in field 30. At this point, the user may elect to continue with the query construction by clicking continue button 37 or may cancel the query construction by clicking cancel button 39.

FIG. 3 illustrates an embodiment of a natural language query expression and corresponding meta-information 102 that may be presented to the user upon entering information into the fields displayed in interface 20 of FIG. 1 and clicking the continue button 37. The meta-information 102 includes the list name, purpose, data source selection and query template name selected in the displays (or interfaces) of FIGS. 1 and 2, as well as a status field 106 that indicates the status of the query expression (e.g., in draft, completed, archive status, etc.).

In the particular embodiment shown, the natural language query expression 104 includes a list of conditions $105_1$-$105_5$ (under the heading "Selections" 103) each condition 105 including at least one selectable value and/or one selectable operator. Also, each of the conditions 105 is expressed as a grammatical phrase and each of the narrowing conditions $105_2$-$105_5$ that follow opening condition $105_1$ includes one or more conjunctions 131 to form a logical association with one or more others of the conditions 105. By this arrangement, the collective list of conditions (i.e., the query expression 104) has a sentence-like structure, referred to herein as a query sentence, and may be expressed in the vernacular of a selected language and dialect.

In the embodiment of FIG. 3, the conjunction 131 included in each narrowing condition (i.e., each condition following opening condition $105_1$) is an "and" that expresses a logical AND relationship between the condition in which it is included and the preceding condition or set of conditions in the query expression 104. That is, both conditions conjoined by the logical AND are to be met by a record of a data source in order for the record to be included in the query result. In one embodiment, all conditions are joined by "and" conjunctions. In alternative embodiments, all the conditions or any one or more of the conditions may be joined to one or more others of the conditions by virtually any conjunction 131 including without limitation, "plus," "also," "additionally," and so forth, and disjunctive conjunctions including, without limitation, "but," "or," "alternatively," "either," "although," and so forth, to establish a desired logical combination of conditions and a desired grammatical expression. Also, the conjunctions 131 may be expressed using mathematical and/or logical symbols instead of prose expressions.

Still referring to FIG. 3, a running totals column 107 is provided to enable a projected running total of the number of records that will appear in the query result as each of the conditions $105_1$-$105_5$ is applied. A delta column 109 is also provided to show the change in the number of returned records that results from application of a given condition. A delete column 111 is also provided to enable deletion of one or more of the narrowing conditions $105_2$-$105_5$.

Figure 4:
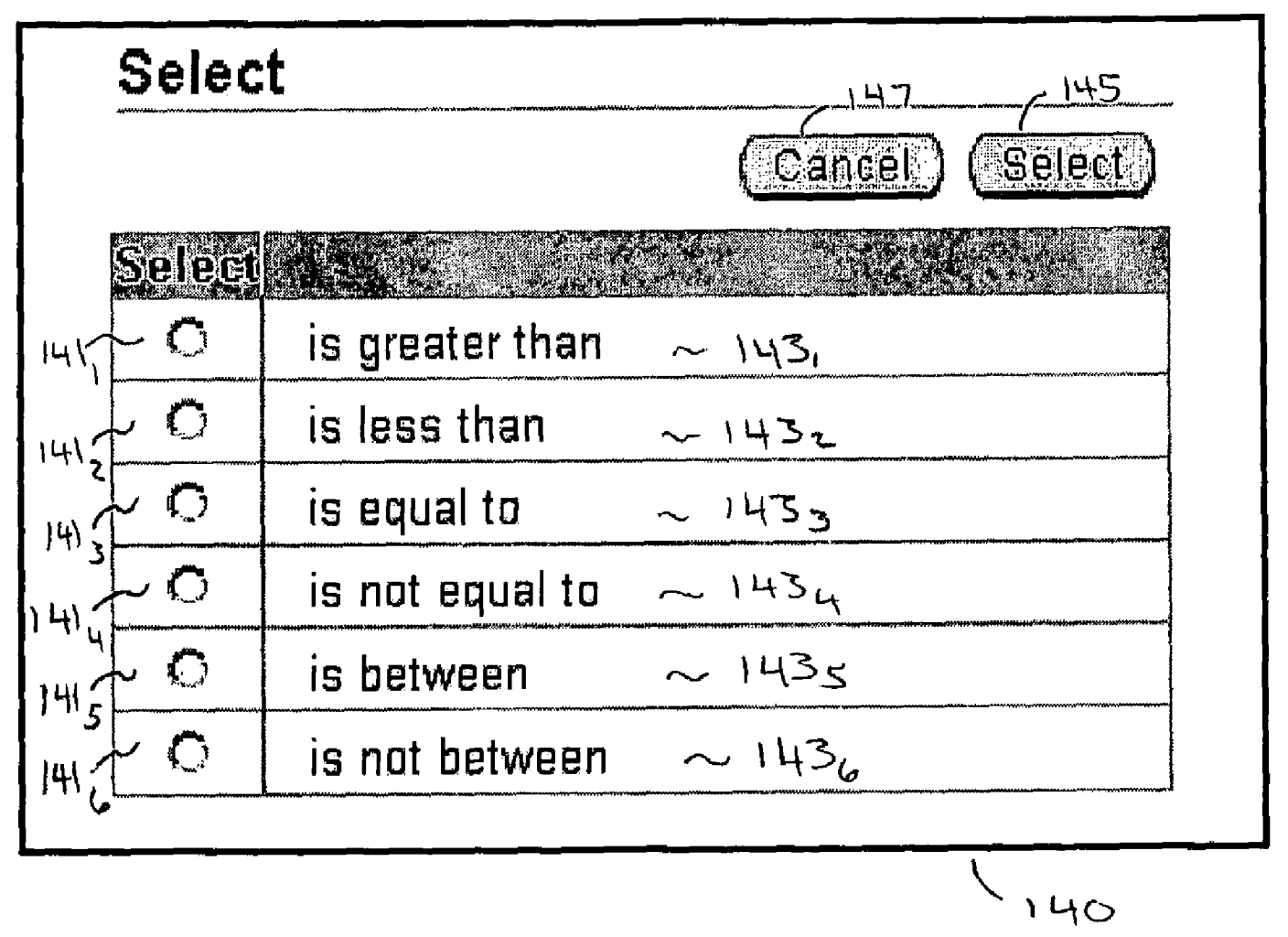

In the exemplary query expression of FIG. 3, each of the conditions $105_1$-$105_5$ includes an operator prompt 122 in the form of a distinctively shaded, colored and/or formatted (e.g., underlined and grayed in the example shown) default operator. The user is thus prompted to click the operator prompt 122 to obtain a list of operators that may be selected in place of the default operator. In one embodiment, the operator prompt 122 is implemented as a hyper-text link using a hyper-text markup language (e.g., HTML, XTML) or the like and, when clicked, directs a web-browsing computer program to display, for example, the dialog box 140 shown in FIG. 4 (pull-down menus or other list selection techniques may be used in alternative embodiments). The user may select any of the operators $143_1$-$143_6$ expressed in the dialog box 140 by clicking a corresponding one of buttons $141_1$-$141_6$, then clicking the select button 145. If the user chooses not to change the default operator, the user may click the cancel button 147 to return to the query expression display of FIG. 3. In the particular list of operators shown, each of the operators expresses an equality, inequality or between/not-between condition and is referred to herein as being an equality operator. Other lists of operators may include any number of logical operators that express a Boolean condition (AND, OR, NOT, exclusive-OR, etc.), proximity operators that express a proximity between search terms (NEAR, WITHIN, BY, etc.). In alternative embodiments, each of the conditions 105 shown in FIG. 3 may include more or fewer operator prompts 122 than shown (including no operator prompt), and the operator prompts 122 in different conditions 105 may, upon being clicked, result in presentation of different sets of selectable operators (e.g., equality operators, logical operators, proximity operators or any other types of operators and any combinations of different types of operators).

Figure 5:
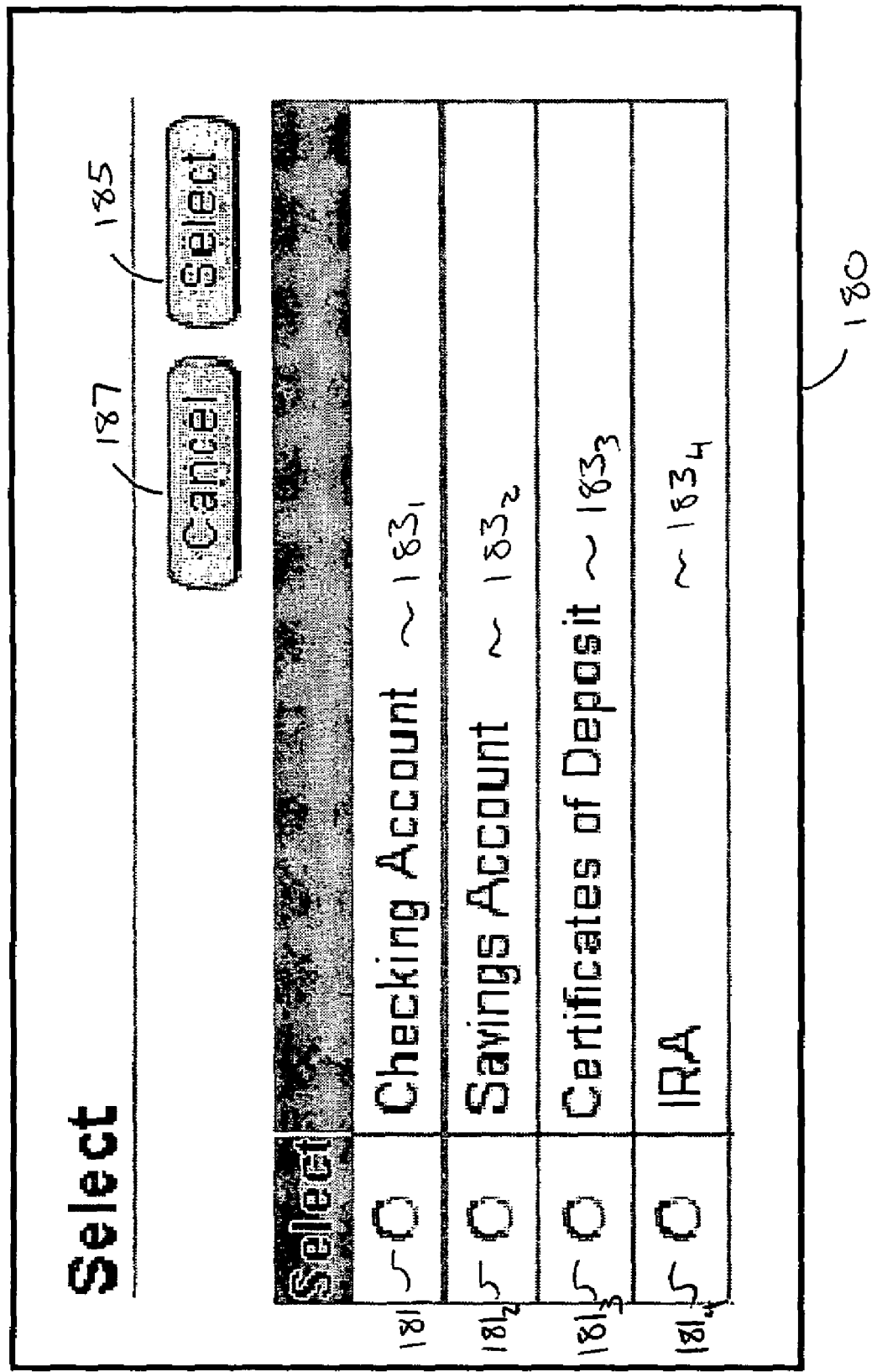
FIG. 5 illustrates a dialog box that may be used to select one of a plurality of values to be included in a query expression.

Still referring to FIG. 3, each of the conditions 105 additionally includes a value prompt 124 in the form of a distinctively shaded, colored and/or formatted label; the label, in this example, being "<Select Bank Account Type>." The user is thus prompted to click the value prompt 124 to obtain a list of values that may be selected in place of the label. In one embodiment, the value prompt 124 is implemented as a hyper-text link using a hyper-text markup language (e.g., HTML, XTML) or the like and, when clicked, directs a web-browsing application to display, as an example, the dialog box 180 shown in FIG. 5 (pull-down menus or other list selection techniques may be used in alternative embodiments). The user may select any of the values $183_1$-$183_4$ expressed in the dialog box 180 by clicking a corresponding one of buttons $181_1$-$181_4$, then clicking the select button 185. If the user chooses not to select a listed value, the user may click the cancel button 187 to return to the query expression display of FIG. 3. In alternative embodiments; each of the conditions 105 shown in FIG. 3 may include more or fewer value prompts 124 than shown (including no value prompt), and the value prompts 124 in different conditions may, upon being clicked, result in presentation of different sets of selectable values. Also, multiple instances of the same value prompt may appear in the query expression to improve readability. For example, the value prompt 124 that appears in opening condition $105_1$ also appears in narrowing condition $105_2$. In one embodiment, once a selection is made in either instance of a multi-instance value prompt, the other instance is automatically updated with the selected value. In the case of value prompts 124 that require entry of a numeric value or other value having an extensive range, the user may be prompted in the dialog box to enter a value within one or more valid ranges. For example, when the value prompt "<Enter Number>" in condition $105_2$ is clicked, a dialog box may be presented to enable the user to enter a numeric value.

FIG. 6 illustrates an exemplary display 220 of the query expression of FIG. 3 after each of the different value prompts has been replaced with a selection made from a respective list of values or with a user-input value. For example, value prompts 227 (including instances $227_1$ and $227_2$), 228, 229, 230 and 231 have been replaced by selected values "Checking Account," "2000," "No," "18," "35," and "High," respectively. As discussed above, different instances of the same value prompt (e.g., $227_1$ and $227_2$) need not be separately clicked, as the selection made in one instance may be automatically applied in the others. In the particular example of FIG. 6, each of the operator prompts 122 are shown in their default state (i.e., default operators used). One or more of the default operators may alternatively be changed to other operators according to the desired query result.

Returning to FIG. 3, after the value prompts 124 have been replaced with selections (or entered values) and the operator prompts 122 used to set the desired set of operations the user may click preview button 119 to execute the query expression (i.e., search the data source using the query expression) and view a subset of entries that will appear in the query result. The user may also click recalculate button 117 to execute the query expression and obtain running totals and delta values for the various conditions. Referring to display 260 of FIG. 7, for example, the running totals column 107 lists the total number of records remaining after each condition in the query expression is applied, and the delta column 109 indicates the change in the number of records after application of a given narrowing condition. For example, the opening condition $225_1$ returns 3950 records, which is reduced to 2875 conditions by narrowing condition $225_2$, a delta (change) of −1075 records. Similarly, narrowing condition $225_3$ reduces the number of records to 1150, a delta of −1725, and so forth. By presenting the running totals and deltas in this manner, users may quickly determine whether the query expression has returned a manageable or otherwise desired number of records, and the effectiveness and ineffectiveness of the individual conditions $225_1$-$225_5$ in narrowing the query result. If the desired number of records is too small or otherwise unsatisfactory, the user may delete one or more of the narrowing conditions by clicking a corresponding one of the delete icons in column 11 or may modify the value selections and/or operator selections by clicking one or more of the values and/or operators in the query expression, changing the selections using the operator and value selection displays described in reference to FIGS. 4 and 5, then clicking the recalculate button 117. In one embodiment, the delete icon 265 that corresponds to the opening condition is displayed in a recessed format (or other distinctive format) to indicate that the opening condition $225_1$ may not be deleted. In alternative embodiments, the opening condition $225_1$ may be deleted.

Figure 8:
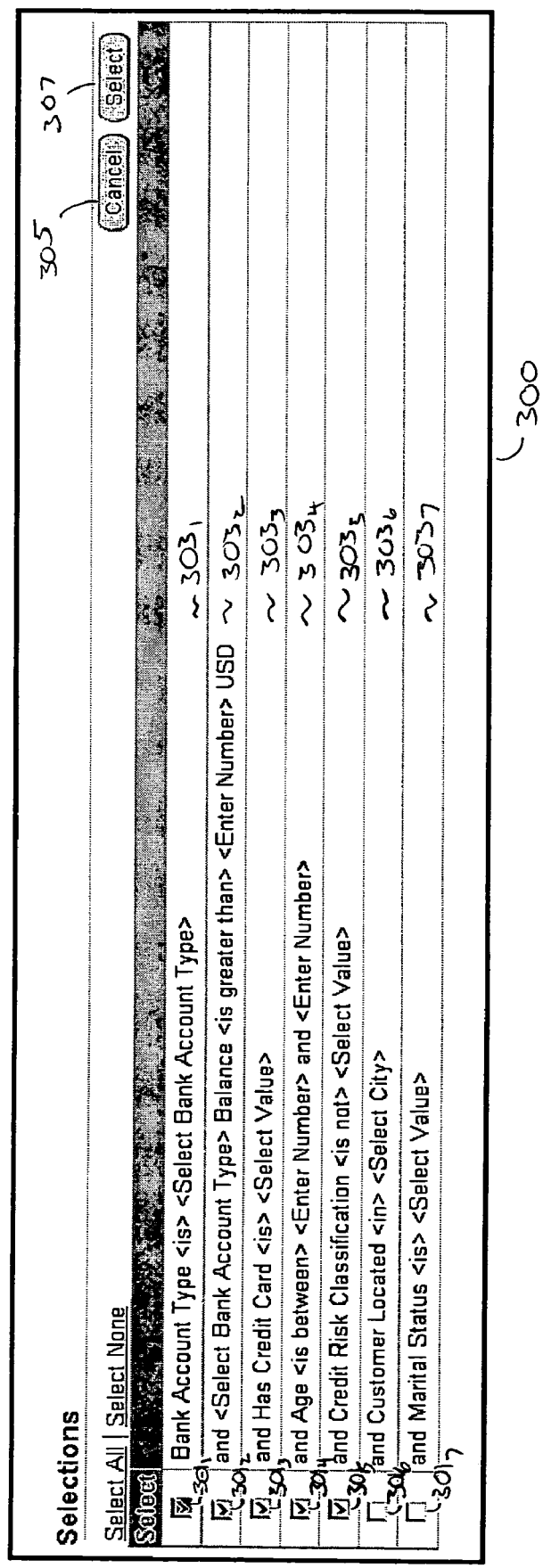
FIG. 8 illustrates an exemplary display that may be used to select and remove conditions from the query expression of FIG. 3.

Still referring to FIG. 7, the user may also modify the query expression by adding or removing conditions 225 within the query. In one embodiment, for example, when the user clicks the modify selections button 115, the condition selection display 300 of FIG. 8 is presented to enable the user to select additional conditions to be added to the query expression and to enable the user to deselect conditions included by default in the query expression. In display 300, for example, the first five conditions $303_1$-$303_5$ of the total set of available conditions is selected by default as indicated by check marks in corresponding selection boxes $301_1$-$303_5$. The selected conditions may be deselected by clicking the corresponding selection box (flipping the state of the box from checked to unchecked) and, conversely, deselected conditions may be selected by clicking the corresponding selection box. For example, conditions $303_6$ and $303_7$ may be selected by clicking selection boxes $301_6$ and $301_7$, respectively. After the desired selections and deselections have been made, the user may click select button 307 to return to the query expression display of FIG. 7, with the newly selected conditions shown with value prompts and/or operator prompts as described in reference to FIG. 3. If the user elects not to keep the selections and deselections entered in the display of FIG. 8, the user my click the cancel button 305 to return to the query expression display of FIG. 6. In the embodiment of FIG. 8, the opening condition $303_1$ is selected by default and may not be deselected as indicated by shaded selection box $301_1$. In alternative embodiments, the opening condition $303_1$ may be deselected.

Referring again to FIG. 7, in one embodiment, the user may click an SQL (Structured Query Language) button 123 to view the natural language query expression in the format of a SQL statement. That is, the query expression formed by the list of conditions $225_1$-$225_5$ is converted to a SQL statement that expresses the same combination of conditions and that may be executed within a database management system that supports SQL. Also, the user may click an options button 121 to select various options for displaying the query results (e.g., selecting one or more columns of information to be displayed in each returned record, limiting the number of returned records (i.e., the size of the list), applying de-duplication rules for avoiding duplicate records, etc.). After the user is satisfied with the query expression and option selections, the user may click finish button 125 to execute the query and obtain a query result. Referring to the query result display 340 of FIG. 9, for example, the query result 341 may include any number of categories (or columns) of information presented in groups of N records at a time, the categories and value of N being selected, for example, by clicking the options button 121 in the display 260 of FIG. 7. In the particular embodiment shown, the user may enter a description of the particular instantiation of the query result 341 in description field 342. The user may also click a selections link 343 to return the query expression display 260 of FIG. 7; a generation link 345 to view other generations of the query expression; a charts link 349 to chart one or more columns of information in the query result 341; and/or a notes link to enter notes relating to the query result 341 or query construction. The user may also choose one of several actions from pull-down menu 359 including without limitation, splitting the list (e.g., creating two or more smaller lists based on data attributes, number of desired records, or other criteria), archiving the list, exporting the list and so forth. After selecting an action from pull-down menu 359, the user may click Go button 361 to carry out the selected action. The user may also choose one of multiple views of the query result by selecting a different view from pull-down menu 353 and clicking Go button 355 after making a selection. The user may also construct a custom view of the query result 341 by clicking the personalize button 357 and selecting categories of data to be presented. In the particular embodiment shown in FIG. 9, the user may scroll between groups of N records in the query result (10 records at a time in this example) by clicking the Next icon 363 and Previous icon 365, and may go to the starting and ending groups of records in the query result 341 by clicking start and end icons 367 and 369, respectively. After the user is satisfied with the query result 341, the user may click apply button 373 to archive the query expression, notes and other information entered by the user to describe the purpose of the query and resulting query result 341.

Generating a Purpose-Driven Query Template

Figure 10:
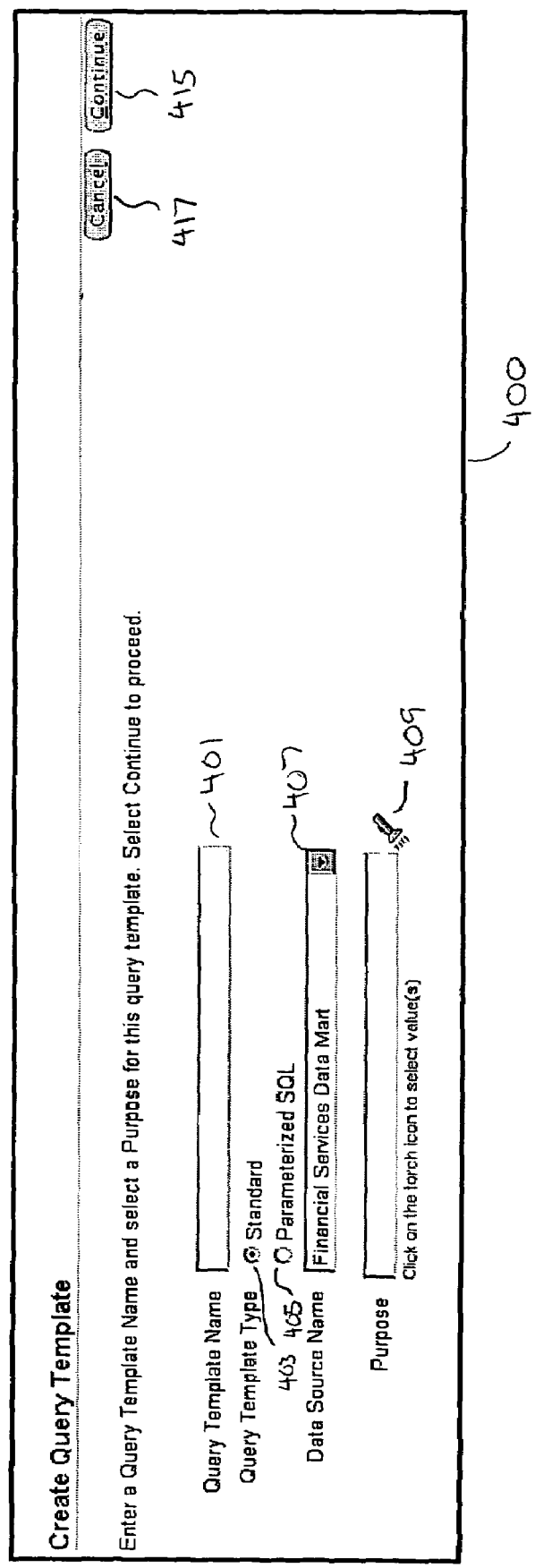
FIG. 10 illustrates an exemplary template-creation display that may be presented to an administrator in response to a request to create a purpose-driven query template.

In one embodiment, the purpose-driven query template selected by the user (e.g., as described above in reference to FIGS. 1 and 2) is created by an administrative user ("administrator") which may be, for example, an individual or entity having access to a template-generation feature of a database management system. FIG. 10 illustrates an exemplary template-creation display 400 that may be presented to the administrator in response to a request to create a purpose-driven query template. As shown, the administrator is prompted to enter a query template name in field 401 and select a data source and purpose to be associated with the query template name. In the particular embodiment shown, the administrator may select the data source from a pull-down menu 407, and may click icon 409 to select a query purpose. The administrator may also select either a natural-language query type or a parameterized SQL query type by clicking one of buttons 403 and 405, respectively. In alternative embodiments, no type selection may be permitted (e.g., query type is always a natural-language type) or additional or alternative query types may be selected.

In one embodiment, when icon 409 is clicked, the exemplary query purpose list 440 of FIG. 11 is displayed to enable the administrator to select one or more query purposes to be associated with or removed from association with the query template being created. For example, the administrator may click one or more of selection boxes $441_1$-$441_6$ or select all icon 449 to associate corresponding ones (or all) of query purposes $443_1$-$443_6$ with the query template, or the administrator may click select none icon 451 to clear previous purpose selections and start over. One or more other displays may be provided to enable the administrator to add, delete or modify query purposes within the query purpose list 440 of FIG. 11.

Returning to FIG. 10, after entering a query template name and selecting a query type, query purpose and data source, the administrator may click the continue button 415 to proceed with query template creation. If the administrator elects not to proceed, the administrator may click cancel button 417 to return to a previous display. In one embodiment, if the administrator elects to proceed with creation of a purpose-driven natural language query template, the exemplary condition-entry display 480 of FIG. 12 is presented. The condition-entry display 480 presents meta-data 482 that includes the administrator's selections from the prior displays (i.e., query template name, data source name, query template type, query purpose), the name of the specific table, view or other data structure in which the query result is to be saved 483, and a unique identifier 484 that may be used as a primary key within the query result (i.e., a value guaranteed to be distinct in each record of the query set). The administrator is additionally prompted to enter conditions, one after another in respective rows of a conditions table 485. In the particular embodiment of FIG. 12, for example, the administrator is prompted to click the add-row button 510 to add an initial or additional condition to conditions table 485 and therefore to the query template. Upon, clicking the add-row button 510, the user is presented with an empty row in the conditions table 485, as shown in condition-entry display 520 of FIG. 13, and thereby prompted to enter an attribute 487, attribute display name 489, set of available operators 491, default operator 493, value 495 and value display 497 which collectively establish a user-modifiable condition. The user is additionally prompted by selection boxes 499 and 501 to specify whether the condition is to be present by default in a query expression and whether the condition is mandatory (i.e., can or cannot be deleted from the query expression). After a condition or any portion thereof is entered into a row of the conditions table 485, the condition may be deleted from the table by clicking delete icon 505. Also, an "In Use" field 503 may be provided to indicate whether a particular condition is selected for inclusion within a query expression based on the query template.

Still referring to FIG. 13, when the administrator clicks the attribute-selection icon 521, a list of available attributes is presented, for example, as shown in the attribute selection display 560 of FIG. 14. In one embodiment, the list of attributes is hierarchically listed according to the table, view, join or other data source containing the attribute, thereby enabling the attributes of a normalized (e.g., multi-table) data source to be presented in accordance with the structure of the data source. Thus, in the exemplary attribute selection display 560 of FIG. 14, the administrator may select a person name, e-mail address, age or marital status from a table (or view, join, query set, etc.) entitled "Financial Services Customers," or may select an account type or account balance from a table, entitled "Bank Accounts," that is linked to the Financial Services Customers table and so forth. The administrator may also click join button 571 to create a join between the data source and one or more other tables, views, joins, query sets, thereby enabling additional attributes to be selected. The join button 471 may also be clicked to create an additional instance of a listed data source. The administrator may also select a parameter from pull-down menu 570 to be the selected attribute, for example, to reference a value selected in another condition of the query expression. After an attribute is selected, the administrator may click the select button 573 to return to the condition-entry display 520 of FIG. 13 and proceed with condition entry based on the selected attribute. The administrator may also click the cancel button to cancel the attribute selection action and return to the condition-entry display.

Returning to FIG. 13, after an attribute 487 has been selected, the administrator may enter an attribute display name 489 to improve readability of the resulting query expression. For example, if the administrator chose the attribute "Account Type" from the attribute selection display 560 of FIG. 14, then the selected attribute may be shown in the attribute field as Bank Account.Account Type with the dot operator indicating that the Account Type attribute is a member of the Bank Account table (or other data object). To hide this complexity from the query template user, the administrator may enter "Bank Account Type" as the attribute display name 489 so that the more understandable expression will be displayed in the resulting natural language query expression. After entering the attribute display name 489, the administrator may click the operator select icon 523 to select the set of operators that will be made available to the query template user. FIG. 15 illustrates an exemplary operator selection display 600 that is presented when the operator select icon 523 of FIG. 13 is clicked. As shown, the administrator may select any number of the operators $604_1$-$604_9$ by clicking selection blocks $601_1$-$601_9$ or the select all icon 607. Conversely, the administrator may deselect any selected operators 604 by clicking the corresponding selection blocks 601 or by clicking the select none icon 609. In the particular embodiment of FIG. 15, the display name for each operator 604 is presented next to the operator in column 605. The operator display name may be fixed, or may be modifiable by the administrator. After the desired set of operators is selected, the administrator may click the select button 615 to enter the selected set of operators into the available operators field of the condition being constructed and return to the condition-entry display 520 of FIG. 13. Alternatively, the administrator may click the cancel button 611 to return to the condition-entry display without entering the selected operators into the available operators field. Returning to FIG. 13, the administrator may click the default operator icon 525 to select one of the available operators to be the default operator. In one embodiment, the default operator is selected in a display substantially similar to the display of FIG. 15, but in which only one operator from the available set of operators is selected.

Still referring to FIG. 13, the administrator may click the value-select icon 527 to select a list of values (or user-input prompt) to be entered as value 495. FIG. 16 illustrates an embodiment of a value selection display 640 that may be presented when the value-select icon 527 of FIG. 13 is clicked. As shown, the administrator may select any of a number of different categories of search values from pull-down menu 645 including, without limitation, a list of values, a list of data source attributes, a calculation based on one more values and/or attributes, or user-input. Additional or alternative categories of search values may be selected in alternative embodiments. After selecting a particular category of search values, the administrator may click the Go button 647 to obtain a selectable list of values, attributes, calculations, etc.

In one embodiment, when the administrator selects the list of values category, the attribute specified in the attribute field of the condition under construction (i.e., attribute 487 of FIG. 13) is queried to obtain a list of values that occur within the data source under that attribute. In the example shown, the six types of accounts $643_1$-$643_6$ present in the data source under the account type attribute are presented in the value selection display 640 to enable administrator selection and deselection of the values 643 to be included in the list of values (i.e., by clicking selection boxes $641_1$-$641_6$, select all icon 644 and/or select none icon 642). In alternative embodiments, values in the list of values may also or alternatively be drawn from a predetermined list of values.

Still referring to FIG. 16, when the attributes category is selected from pull-down menu 645 (and Go button 647 clicked), attributes are listed for selection in a manner similar to that shown in FIG. 14, except that multiple attributes may be selected using selection boxes and/or select all and select none icons. When the calculation category is selected, the administrator is prompted to enter one or more analytical or logical expressions that may be selected or affected by the user (e.g. User Input/100). The expressions may include one or more prompts for user input, values and/or attributes as operands. Finally, if the user-input category is selected, the user may be prompted to indicate the type and format of the data to be solicited (e.g., numeric, date, text, allowed number of characters and/or digits, mask to be applied, upper and or lower boundaries, etc.) a prompt statement that is presented to inform the user of the nature of the requested data and so forth. After selecting a set of selectable values (including a list of values, attributes or calculations) or user-input, the administrator may click the select button 651 to return to the condition-entry display 520 of FIG. 13 and proceed with condition entry. The administrator may also click the cancel button 653 to cancel the value selection action and return to the condition-entry display.

Returning to FIG. 13, after a value set has been specified in the value field, the administrator may enter a corresponding label in the value display field. The label constitutes the value prompt that will be displayed in the natural-language query expression to prompt the user to select a value. Thereafter, the administrator may optionally click the default box 499 to indicate that the condition is to be included in the query expression by default, and the mandatory box 501 to indicate that the condition may not be removed from the query expression by the user.

FIG. 17 illustrates a display 680 showing the state of the conditions table of FIGS. 12 and 13 after a pair of conditions have been entered. In the example shown, the first condition 681 (i.e., first row of the table) includes a Bank Account.Account Type attribute, "Bank Account Type" attribute display name, set of available operators ("is" and "is not" in this example), default operator ("is" in this example), value selection (e.g., the checked values from the list of values shown in FIG. 16), and a value display name "<Select Bank Account>." The condition 681 is also indicated to be a default and mandatory condition of the query expression. In the second condition 683, the attribute is selected from the parameter pull-down of FIG. 14 to match the value display (and, after a selection is made, the selected value) of the first condition 681. The condition further includes attribute display, "Balance," set of available operators ("is equal to," "is not equal to," "is greater than" and "is less than" in the example shown), default operator ("is greater than" in this example), value selection (user-input in this example), and value display ("<Enter Number>"). The condition 683 is indicated to be a default condition of the query expression, but not mandatory.

Still referring to FIG. 17, after each desired condition has been entered (or after any group of conditions is entered), the administrator may click validate button 507 to confirm that the conditions entered are valid, with the database management system signaling the administrator in the case of error. Also, after entering each condition or any group of conditions, the administrator may click preview button 509 to preview the template query expression. FIG. 18, for example, illustrates a template-preview display 720 of a query expression having six conditions $723_1$-$723_6$, starting with the two conditions described in reference to FIG. 17. The administrator may view any of the operators and value lists by clicking the corresponding operator prompts and value prompts presented within the conditions 723 (implemented by hyperlinks in this example). The administrator may also reorder the conditions 723 (thereby changing the order of conditions within the underlying conditions table) by clicking a reorder icon 727 associated with a given condition 723, then moving the condition up or down in the list. The administrator may cancel any condition reordering before returning to the conditions entry display by clicking cancel button 729 and may complete any such reordering by clicking finish button 723. After completing any reordering and finishing with the preview-display 720, the administrator may click back button 731 to return to the conditions entry display.

Returning to FIG. 17, upon entering the desired conditions within the conditions table, the administrator may finish and save the completed query template by clicking finish button 511. After the administrator finishes and saves a given query template, the query template may be selected by users to enable construction of purpose-driven query expressions as discussed above in reference to FIGS. 1-9. The administrator may also return to the template-creation display 400 of FIG. 10 (e.g., to change selections or entries therein) by clicking the back button 513, and may exit the condition entry display without saving changes to the conditions table by clicking cancel button 515.

It should be noted that while specific sequences of user and administrator actions have been described in reference to FIGS. 1-18, such actions may generally be performed in different order without departing from the spirit and scope of the invention.

Operational Context

The embodiments described above may be implemented in a programmed general-purpose or special-purpose computer system or in a network of computer systems. Alternatively, the embodiments may be implemented in a device that includes hardwired logic for carrying out the above-described operations, or any combination of programmed processors and hardwired logic.

Figure 19:
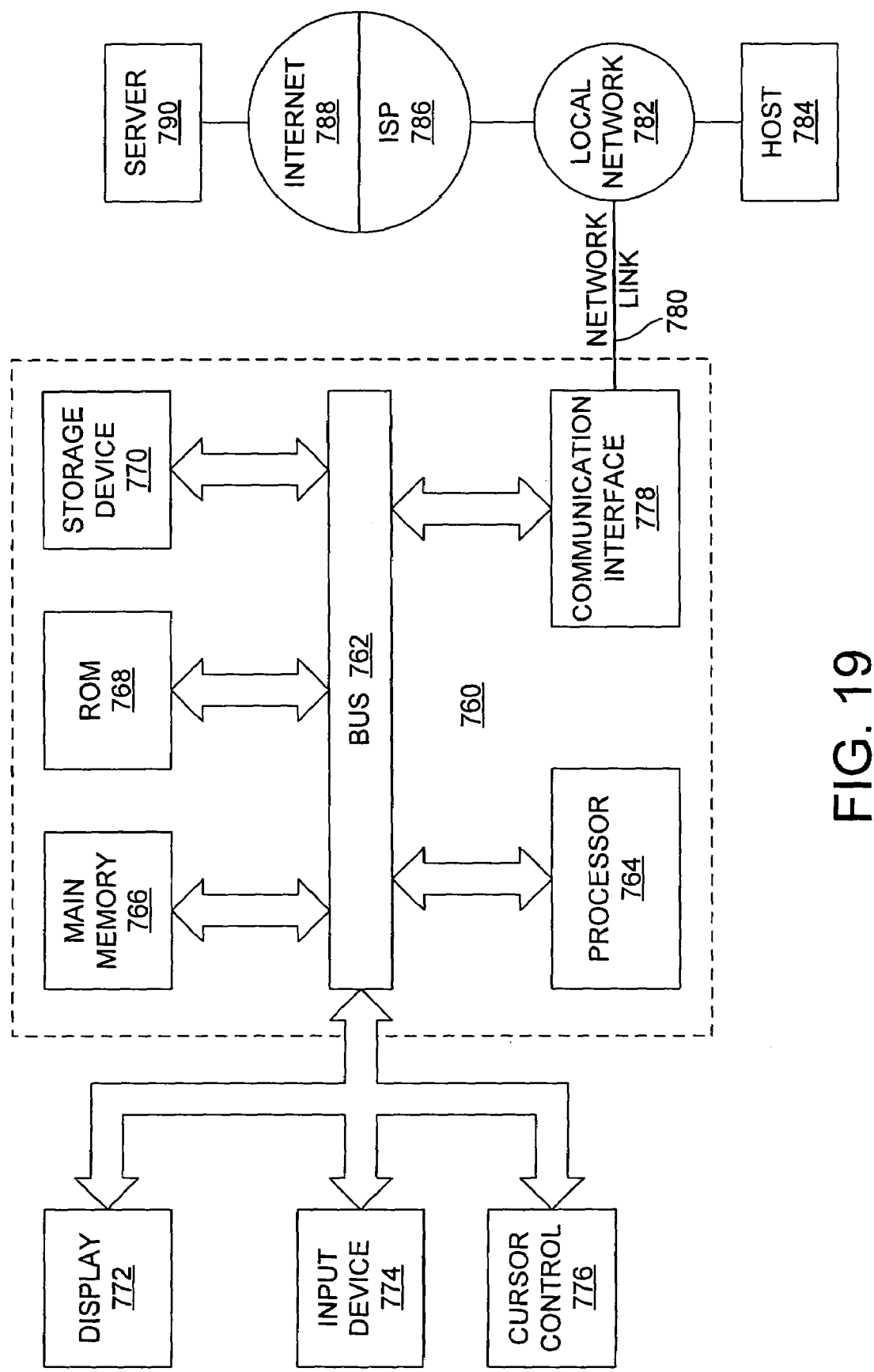
FIG. 19 is a block diagram of an exemplary computer system 760 upon which embodiments of the invention may be implemented.

FIG. 19 is a block diagram of an exemplary computer system 760 upon which embodiments of the invention may be implemented. Computer system 760 includes a bus 762 or other communication mechanism for communicating information, and a processing entity 764 coupled with bus 762 for processing information. The processing entity 764 may include any number of general purpose and/or special purposes processors co-located within a single computing system or distributed over a network of computing systems. Computer system 760 also includes a main memory 766, such as a random access memory (RAM) or other dynamic storage device, coupled to bus 762 for storing information and instructions to be executed by processing entity 764, including the information and instructions that cause the processing entity to carry out the above described operations (e.g., presentation of the above-described displays, data access operations, user-input receipt and so forth). Main memory 766 also may be used for storing temporary variables or other intermediate information during execution of instructions to be executed by processing entity 764. Computer system 760 further includes a read only memory (ROM) 768 or other static storage device coupled to bus 762 for storing static information and instructions for processing entity 764. A storage device 770, such as a magnetic disk or optical disk, is provided and coupled to bus 762 for storing information and instructions, such as instructions for carrying out the above described operations and storing the above-described data sources.

Computer system 760 may be coupled via bus 762 to a display 772, such as a cathode ray tube (CRT), for displaying information to a computer user. An input device 774, including alphanumeric and other keys, is coupled to bus 762 for communicating information and command selections (e.g., as described above) to processing entity 764. Another type of user input device is cursor control 776, such as a mouse, a trackball, or cursor direction keys for communicating direction information and command selections to processing entity 764 and for controlling cursor movement on display 772. This input device typically has two degrees of freedom in two axes, a first axis (e.g., x) and a second axis (e.g., y), that allows the device to specify positions in a plane.

According to one embodiment of the invention, the operations and techniques described herein are performed by computer system 760 in response to processing entity 764 executing one or more sequences of one or more instructions contained in main memory 766. Such instructions may be read into main memory 766 from another computer-readable medium, such as storage device 770. Execution of the sequences of instructions contained in main memory 766 causes processing entity 764 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processing entity 764 for execution. Such a medium may take many forms, including but not limited to, non-volatile media, volatile media, and transmission media. Non-volatile media includes, for example, optical or magnetic disks, such as storage device 770. Volatile media includes dynamic memory, such as main memory 766. Transmission media includes coaxial cables, copper wire and fiber optics, including the wires that comprise bus 762.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, or any other medium from which a computer can read.

Various forms of computer readable media may be involved in carrying one or more sequences of one or more instructions to processing entity 764 for execution. For example, the instructions may initially be carried on a magnetic disk of a remote computer. The remote computer can load the instructions into its dynamic memory and send the instructions over a telephone line or other signaling medium using a modem. A modem local to computer system 760 can receive the data on the signaling medium and use an infra-red transmitter to convert the data to an infra-red or other type of signal. An infra-red or other signal detector can receive the data carried in the signal and appropriate circuitry can place the data on bus 762. Bus 762 carries the data to main memory 766, from which processing entity 764 retrieves and executes the instructions. The instructions received by main memory 766 may optionally be stored on storage device 770 either before or after execution by processing entity 764.

Computer system 760 also includes a communication interface 778 coupled to bus 762. Communication interface 778 provides a two-way data communication coupling to a network link 780 that is connected to a local network 782. For example, communication interface 778 may be an integrated services digital network (ISDN) card or a modem to provide a data communication connection to a corresponding type of telephone line. As another example, communication interface 778 may be a local area network (LAN) card to provide a data communication connection to a compatible LAN. Wireless links may also be implemented. In any such implementation, communication interface 778 sends and receives electrical, electromagnetic or optical signals that carry digital data streams representing various types of information.

Network link 780 typically provides data communication through one or more networks to other data devices. For example, network link 780 may provide a connection through local network 782 to a host computer 784 or to data equipment operated by an Internet Service Provider (ISP) 786. ISP 786 in turn provides data communication services through the world wide packet data communication network now commonly referred to as the "Internet" 788. Local network 782 and Internet 788 both use electrical, electromagnetic or optical signals that carry digital data streams. The signals through the various networks and the signals on network link 780 and through communication interface 778, which carry the digital data to and from computer system 760, are exemplary forms of carrier waves transporting the information.

Computer system 760 can send messages and receive data, including program code, through the network(s), network link 780 and communication interface 778. In the Internet example, a server 790 might transmit a requested code for an application program through Internet 788, ISP 786, local network 782 and communication interface 778.

The received code may be executed by processing entity 764 as it is received, and/or stored in storage device 770, or other non-volatile storage for later execution. In this manner, computer system 760 may obtain application code in the form of a carrier wave.

The section headings in the preceding detailed description are provided for convenience of reference only, and are in no way intended to define, limit, construe or describe the scope or extent of such sections. Also, while the invention has been described with reference to specific exemplary embodiments thereof, it will be evident that various modifications and changes may be made thereto without departing from the broader spirit and scope of the invention. The specification and drawings are, accordingly, to be regarded in an illustrative rather than restrictive sense.

What is claimed is:

1. A method comprising:
   prompting a user to select one of a plurality of templates;
   receiving user input that indicates a selected one of the plurality of templates; and
   displaying the selected template in a format in which each of a plurality of conditions is grammatically joined to at least one other condition to form a query sentence, and
   wherein each of the plurality of conditions has: (a) a pre-selected attribute that is not user-modifiable within the condition, and (b) one or more user-selectable fields, wherein a user-selectable field allows a user of the template to define the condition for the pre-selected attribute;
   wherein the one or more user-selectable fields comprises a set of operators that express a relationship between two or more objects in the query sentence, and
   wherein the method steps are performed by one or more computing devices.

2. The method of claim 1 further comprising prompting a user to select one of a plurality of query purposes.

3. The method of claim 2 further comprising receiving a request to query a data source and wherein prompting a user to select one of a plurality of query purposes comprises prompting a user to select one of the plurality of query purposes in response to receiving the request to query a data source.

4. The method of claim 3 wherein receiving a request to query a data source comprises receiving user-input that identifies one of a plurality of data sources to be queried.

5. The method of claim 4 wherein prompting a user to select one of the plurality of query purposes comprises:
   selecting a first set of query purposes from a plurality of sets of query purposes based on the identified one of the plurality of data sources;
   displaying the first set of query purposes; and
   prompting the user to select a query purpose from the first set of query purposes.

6. The method of claim 1 wherein displaying the selected template comprises displaying the first selected template in a format in which the plurality of conditions in the first list are grammatically joined by respective conjunctions.

7. The method of claim 6 wherein at least one of the conjunctions is a disjunctive conjunction.

8. The method of claim 1 wherein at least one of the two or more objects in the query sentence is another set of user-selectable values.

9. The method of claim 1 wherein the set of operators comprises at least one equality operator.

10. The method of claim 1 wherein the at least one equality operator is a prose expression.

11. The method of claim 1 further comprising displaying, for each condition in the selected template, a value that indicates the number of data source records that meet both the condition and any preceding conditions in the first list of conditions.

12. The method of claim 1 further comprising displaying data source records that meet each of the conditions in the selected template.

13. A method of generating a template comprising:
receiving a list of attributes;
for each attribute, receiving information that indicates how a user who forms a query using the template is allowed to define a condition for the attribute;
based on the list of attributes and the information, generating the template comprising a set of conditions, wherein each condition in the template is grammatically joined to at least one other condition in the template to form a query sentence, and wherein each condition in the template includes a pre-selected attribute from the list of attributes and one or more user-selectable fields based on the information, wherein the pre-selected attribute in each condition is not user-modifiable within the condition;
wherein the one or more user-selectable fields comprises a set of operators that express a relationship between two or more objects in the query sentence; and
storing the template,
wherein the method steps are performed by one or more computing devices.

14. The method of claim 13 wherein the list of attributes correspond to columns within a hierarchical data source.

15. The method of claim 13 further comprising:
prompting a user that is defining the template whether each of the conditions may be removed from the template at the option of a user who forms a query using the template.

16. The method of claim 13, wherein the pre-selected attribute in each of the conditions is not selectable by a user who forms a query using the template.

17. The method of claim 13, wherein generating the template defines a fixed grammatical structure for the template.

18. The method of claim 13, further comprising:
receiving user input that indicates a selection of a query purpose from a plurality of query purposes; and
associating the template with the query purpose.

19. The method of claim 13, wherein the information includes a set of values from which the user who forms a query using the template is allowed to select a value.

20. The method of claim 13, wherein the information defines a calculation that is to be made based on input from a user who forms a query using the template.

21. The method of claim 13, wherein the information defines input to be requested from a user who forms a query using the template.

22. The method of claim 13, wherein the information includes a set of value attributes from which a user who forms a query using the template is allowed to select a value attribute to be used in forming the condition.

23. The method of claim 13, wherein the information includes a set of operators from which the user who forms a query using the template is allowed to select an operator to form the condition for the pre-selected attribute.

24. A computer-readable medium storing one or more sequences of instructions which, when executed by one or more processors, causes the one or more processors to:
receiving a list of attributes;
for each attribute, receiving information that indicates how a user who forms a query using the template is allowed to define a condition for the attribute;
based on the list of attributes and the information, generating the template comprising a set of conditions, wherein each condition in the template is grammatically joined to at least one other condition in the template to form a query sentence, and wherein each condition in the template includes: a pre-selected attribute from the list of attributes, and (b) one or more user-selectable fields based on the information, wherein the pre-selected attribute in each condition is not user-modifiable within the condition;
wherein the one or more user-selectable fields comprises a set of operators that express a relationship between two or more objects in the query sentence; and
storing the template.

25. The method of claim 1, further comprising:
an administrator indicating that one or more of the plurality of conditions is mandatory;
wherein the pre-selected attribute that is not user-modifiable within the condition is a mandatory condition.

26. The method of claim 1, further comprising:
an administrator indicating that one or more of the plurality of conditions is optional.

27. The method of claim 8 further comprising:
displaying the user-selectable values in the form of value prompts.

28. The method of claim 27 further comprising:
displaying the value prompts with distinctively shaded, colored, and/or formatted labels.

29. The method of claim 27 further comprising:
displaying multiple instances of the same value prompt in order to improve readability.

30. A method comprising:
prompting a user to select one of a plurality of templates;
receiving user input that indicates a selected one of the plurality of templates;
displaying the selected template in a format in which each of a plurality of conditions is grammatically joined to at least one other condition to form a query sentence,
a user-selectable field allowing a user of the template to define the condition for the attribute;
wherein the user-selectable field comprises a set of operators that express a relationship between two or more objects in the query sentence;
displaying and updating the query sentence as the user makes adjustments to one or more of the plurality of conditions; and
concurrently displaying a running totals column thereby enabling a projected total of a number of records, said projected total of a number of records appearing as each of the plurality of conditions is applied,
wherein the method steps are performed by one or more computing devices.

31. The method of claim 30, further comprising:
displaying a delta column which shows a change in the number of returned records that results from application of one of the plurality of conditions.

32. The method of claim 30, further comprising:
displaying a delete column for deleting one or more of the conditions.

33. The method of claim 30 further comprising:
displaying a preview button for enabling a user to view of subset of entries that will appear in a query result.

34. The method of claim 30 further comprising:
displaying a recalculate button to execute a query expression and obtain running totals and delta values for the various conditions within that expression.

35. The method of claim 30 further comprising:
displaying an Structured Query Language (SQL) button which allows a user to view a natural language query expression in the format of an SQL statement.

36. The method of claim 30 further comprising:
displaying a generation link to view alternative generations of a query expression.

37. The method of claim 30 further comprising:
displaying an apply button to archive a query expression, notes, and other information entered by the user.

38. The method of claim 30 further comprising:
displaying a condition-entry display for presenting metadata that includes an administrator's selections from prior displays, name of a specific table, view or other data structure, and a unique identifier that may be used as a primary key.

39. The method of claim 30 further comprising:
allowing an administrator to enter an attribute display name; and
displaying that attribute display name within a natural language query expression.

* * * * *

UNITED STATES PATENT AND TRADEMARK OFFICE
CERTIFICATE OF CORRECTION

| | | |
|---|---|---|
| PATENT NO. | : 7,720,867 B2 | Page 1 of 1 |
| APPLICATION NO. | : 10/937602 | |
| DATED | : May 18, 2010 | |
| INVENTOR(S) | : Keshavan Subramanian et al. | |

It is certified that error appears in the above-identified patent and that said Letters Patent is hereby corrected as shown below:

In column 6, line 40, delete "operations" and insert -- operations, --, therefor.

In column 6, line 64, delete "11" and insert -- 111 --, therefor.

In column 16, line 19, in claim 24, after "includes:" delete "a pre-selected" and insert -- (a) a pre-selected --, therefor.

Signed and Sealed this
Twelfth Day of July, 2011

David J. Kappos
*Director of the United States Patent and Trademark Office*